US009747452B2

(12) United States Patent
Wang et al.

(10) Patent No.: US 9,747,452 B2
(45) Date of Patent: Aug. 29, 2017

(54) METHOD OF GENERATING IN-KERNEL HOOK POINT CANDIDATES TO DETECT ROOTKITS AND THE SYSTEM THEREOF

(71) Applicant: National Chiao Tung University, Hsinchu (TW)

(72) Inventors: Chi-wei Wang, Taitung County (TW); Chong-kuan Chen, Taichung (TW); Chia-wei Wang, Kaohsiung (TW); Shiuhpyng Shieh, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 67 days.

(21) Appl. No.: 14/512,420

(22) Filed: Oct. 11, 2014

(65) Prior Publication Data
US 2015/0242626 A1 Aug. 27, 2015

(30) Foreign Application Priority Data
Feb. 27, 2014 (TW) .............................. 103106866 A

(51) Int. Cl.
*G06F 21/56* (2013.01)
*G06F 21/57* (2013.01)

(52) U.S. Cl.
CPC .......... *G06F 21/577* (2013.01); *G06F 21/561* (2013.01)

(58) Field of Classification Search
None
See application file for complete search history.

(56) References Cited

U.S. PATENT DOCUMENTS

| 7,845,009 | B2 | 11/2010 | Grobman |
| 8,037,526 | B1 | 10/2011 | Satish et al. |
| 8,281,393 | B2 | 10/2012 | Sallam |
| 8,370,941 | B1* | 2/2013 | Pham ...................... G06F 21/56 709/201 |
| 8,397,295 | B1 | 3/2013 | Naftel |
| 8,464,345 | B2 | 6/2013 | Satish et al. |
| 8,893,274 | B2* | 11/2014 | Zhu .................................. 718/1 |
| 9,092,625 | B1* | 7/2015 | Kashyap ............... G06F 21/566 |
| 9,203,862 | B1* | 12/2015 | Kashyap ............... H04L 63/145 |
| 9,607,151 | B2* | 3/2017 | Mooring ............... G06F 21/566 |
| 2002/0029374 | A1* | 3/2002 | Moore .................. G06F 9/4426 717/127 |
| 2007/0240215 | A1* | 10/2007 | Flores ..................... G06F 21/55 726/24 |
| 2008/0016339 | A1* | 1/2008 | Shukla ................... G06F 21/53 713/164 |

(Continued)

FOREIGN PATENT DOCUMENTS

CN 102314561 A 1/2012

OTHER PUBLICATIONS

J. Dai, R Guha and J. Lee, "Efficient Virus Detection Using Dynamic Instruction Sequences", Journal of computers 4(5), 405-414, May 2009.

(Continued)

*Primary Examiner* — Christopher Revak
(74) *Attorney, Agent, or Firm* — The PL Law Group, PLLC

(57) ABSTRACT

A method for determining whether a to-be-tested program contains malicious behavior is disclosed. The method includes steps of providing an emulator having a kernel and a plurality of installed hook points, wherein the kernel has a plurality of in-kernel functions; executing the to-be-tested program in the emulator dynamically to invoke the plurality of installed hook points to obtain a specific in-kernel function set from the plurality of in-kernel functions; and determining whether the to-be-tested program contains instructions for malicious behavior based on an invocation sequence of the specific in-kernel function set.

19 Claims, 9 Drawing Sheets

(56) References Cited

U.S. PATENT DOCUMENTS

| | | | |
|---|---|---|---|
| 2008/0040800 A1* | 2/2008 | Park | G06F 21/562 726/22 |
| 2009/0141895 A1 | 6/2009 | Anderson et al. | |
| 2013/0347131 A1* | 12/2013 | Mooring | G06F 9/45558 726/29 |
| 2014/0189687 A1* | 7/2014 | Jung | G06F 9/45558 718/1 |
| 2015/0178497 A1* | 6/2015 | Lukacs | G06F 9/461 726/23 |
| 2015/0379263 A1* | 12/2015 | Vipat | G06F 21/79 726/23 |

OTHER PUBLICATIONS

D. Bilar, "Fingerprinting malicious code through statistical opcode analysis", Proceedings of the 3rd International Conference on Global E-Security (ICGeS), London, UK, Apr. 2007.

R Tian, L. M. Batten, S.C. Versteeg, "Function Length as a Tool for Malware Classification", Proceedings of the 3rd International Conference on Malicious and Unwanted Software (MALWARE),.pp. 69-76, 2008.

C. Krugel, E. Kirda, D. Mutz, W. K. Robertson and G. Vigna, "Polymorphic worm detection using structural information of executables", RAID, pp. 207-226, 2005.

Q. Zhang and D.S. Reeves, "Metaaware: Identifying meta-morphic malware", Proceedings of the 23rd Annual Computer Security Applications Conference (ACSAC).

S. Sathyanarayan, P. Koh;o, and B. Bruhadeshwar, "Signature Generation and Dection of Malware Families", Proceedings of the 13th Australasian conference on Information Security and Privacy, Wollongong, pp. 336-349.

Office action issued on Feb. 19, 2016 from the TW Patent Office in a counterpart TW Patent Application No. 03106866.

* cited by examiner

METHOD OF GENERATING IN-KERNEL HOOK POINT CANDIDATES TO DETECT ROOTKITS AND THE SYSTEM THEREOF

CROSS REFERENCE TO RELATED APPLICATIONS

The application claims the benefit of the Taiwan Patent Application No. 103106866, filed on Feb. 27, 2014, at the Taiwan Intellectual Property Office, the disclosures of which are incorporated herein in their entirety by reference.

FIELD OF THE INVENTION

The present invention relates to a method of detecting the presence of malicious malware and the system thereof, and more particularly to a method of detecting the presence of malicious malware by monitoring its in-kernel function invocation sequence and the system thereof.

BACKGROUND OF THE INVENTION

In the malware research and defense, it is extremely important to test whether a suspicious program resembles to any known malware. Various techniques have been proposed and developed. These techniques can be classified into static analysis or dynamic analysis depending on the attributes used to measure the similarity between the suspicious programs and the known malware.

In static analysis, the subjects under test are examined and the features are extracted without actual execution. Bilar et al. proposed an approach to distinguish malware and benign programs with statistical analysis of the op-code distribution. Tian et al. measure the code length of each function in the program and use the frequency of their occurrence within a particular sample of malware as the feature for malware classification.

Another proposed automated malware classification system is based on the function length and the printable strings extracted in an executable file. Sathyanarayan et al. proposed generating signatures for malware families with their imported API by scanning the executable files to extract the frequency of invocations of critical APIs in order to evaluate the likelihood of maliciousness. More advanced static analysis utilizes a function call graph to perform malware classification.

Because no execution is needed, the advantage of static analysis is its efficiency but it is ineffective against advance malware which is polymorphic or metamorphic because the static analysis approach lacks runtime information. Krugel et al. and Zhang at al proposed methods to identify the presence of polymorphic or metamorphic malware but its presence cannot be correctly identified if the executable images are packed or encrypted.

On the other hand, dynamic analysis supervises the execution of a program and extracts program features during runtime. Various kinds of dynamic-analysis-based malware recognition techniques have been proposed. Dai et al. proposed a method of executing a program inside a single-step running mode debugger to collect instruction traces of the program. The instruction trace is then decomposed into basic blocks of abstract op-codes and processed using data mining techniques to discover instruction patterns that are in common with a malware sample. Recognizing malware with instruction patterns can still fail to recognize metamorphic malware. This is because advanced metamorphic malware replaces instructions and reorders memory access to disable instruction-pattern-based recognition methods.

Automatic behavior analysis of malware is an important measure in the analysis process to efficiently develop detection methods and solutions for modern, rapidly growing malware. Through behavior analysis, malware instances with similar behaviors can be classified to reduce the effort for human analysts. This is all because of the following two facts.

First, only a few malware are written from scratch. Most malware are variants with simple modifications or upgrades to the original malware. Hence, the variants still inherit the behaviors of the parent malware. Second, malware crafted by advanced polymorphism or metamorphism techniques may deform the appearance of the code but not the program behavior.

Various techniques for malware pattern extraction and recognition have been discussed in previous research. Among these studies, a very common characteristic taken into consideration is the invocation of Application Programming Interface, API, or system calls. Since malware is designed to carry out certain malicious tasks, they inevitably interact with the running environment through these interfaces. In addition, the semantics of program behaviors are actually embedded in invocations on those functions because one important design principle for API is descriptiveness.

However, existing API-trace-based behavior analysis systems lose their advantages when they are facing advanced malware equipped with a kernel-level rootkit. A successfully invasion of the OS kernel implies the acquisition of the privilege of a system administrator, which is able to circumvent or to sabotage any other programs in the system. Although virtualization-based inspection may be used to resolve the aforementioned issues of privilege-escalation, they still have to face the following challenges. A kernel-level program directly invokes kernel-level functions to accomplish its tasks, relying on neither the system nor the user-level APIs. Without a monitoring mechanism for behaviors in the kernel-space, such malware can never be profiled accurately. Therefore, recent researchers are focusing their interests at the kernel-level rootkits.

The methods proposed in U.S. Pat. No. 8,397,295 and U.S. Pat. No. 8,281,393 detect the rootkit by checking system integrity. Their works are only related to certain rootkit features. However, the approach disclosed in the present invention is not limited to certain features and is able to detect the rootkit in general. Moreover, their methods can only detect the existence of the rootkit without recognizing the type of rootkit, which is important when analyzing a rootkit.

The methods proposed in U.S. Pat. No. 8,464,345 and U.S. Pat. No. 7,845,009 use program behaviors as the signature to recognize a rootkit/malware. However, without monitoring the in-kernel function, a high level API may be evaded by a sophisticated rootkit. Moreover, low-level information such as instruction sequences and virtualization traps may extract overwhelming information, which is inefficient and impractical.

In order to overcome the drawbacks in the prior art, methods of generating in-kernel hook point candidates to detect rootkits and the system thereof are disclosed. The particular design in the present invention not only solves the problems described above, but also is easy to implement. Thus, the present invention has utility for the industry.

SUMMARY OF THE INVENTION

In order to overcome the shortcomings of the conventional technologies, the present invention discloses a novel way to detect the presence of malware by monitoring its behavior and activities at the kernel level.

According to a first aspect of the present invention, a method for generating an in-kernel hook point candidate is disclosed. The method includes steps of checking whether an in-kernel access instruction matches a specific format, wherein the in-kernel access instruction uses an index pointer and an offset value associated with the index pointer; recording the offset value of the in-kernel access instruction in an instruction list structure if the in-kernel access instruction matches the specific format; recording a memory address corresponding to the in-kernel access instruction in the instruction list structure and recording an initializing memory address of the instruction list structure as the in-kernel hook point candidate if the index pointer points to one of a stack pointer and a frame pointer; if the index pointer does not point to one of a stack pointer and a frame pointer, performing a backward-slicing operation on the instruction list structure if the in-kernel access instruction does not conform to either one of conditions of matching the specific format and pointing to one of the stack pointer and the frame pointer; and outputting the recorded initialized memory address of the instruction list structure as the in-kernel hook point candidate.

According to a second aspect of the present invention, a system for determining whether a to-be-tested program contains a malicious program is disclosed. The to-be-tested program includes nodes of random occurrence. The system includes a refining module executing the to-be-tested program multiple times to eliminate the nodes; a recording module recording a plurality of instructions executed by the to-be-tested program at the kernel level; a checking module checking whether at least one kernel function sequence invoked by the plurality of instructions points to a memory address containing a specific argument; and a determining module determining whether the to-be-tested program contains malicious intent by checking whether the memory address pointed to by the at least one kernel function sequence contains a hook point of the malicious program according to the specific argument.

According to a third aspect of the invention, a method for determining whether a to-be-tested program contains malicious behaviors is disclosed. The method includes steps of providing an emulator having a kernel and a plurality of installed hook points, wherein the kernel has a plurality of in-kernel functions; executing the to-be-tested program in the emulator dynamically to invoke the plurality of installed hook points to obtain a specific in-kernel function set from the plurality of in-kernel functions; and determining whether the to-be-tested program contains instructions for malicious behaviors based on an invocation sequence of the specific in-kernel function set.

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

To cope with the problems mentioned above, a novel method and the system thereof are proposed to recognize malware through the invocation pattern of kernel functions. By hooking the internal functions of the OS kernel, the kernel-level activities are monitored. This step usually requires massive reverse engineering because some operating systems, such as the Windows operating system, are closed source OS. A module is devised to automatically identify possible locations to place the hooks and the corresponding part of the program code to place the checkpoints. The identified locations are then manually verified by the Malware Analyst and implemented in a PC emulator equipped with system-level taint tracking capability. If any arguments of the hooked function are tainted, the invocation and the associated arguments are recorded.

The present invention performs malware (especially rootkit) behavior recognition in two phases: pattern training and recognition. In the training phase, the present invention executes the known variants of rootkit that belong to the same rootkit family and collects the invocations of important in-kernel functions and their associated arguments. Both the collected invocation sequences and the arguments are used to construct the behavior pattern for that malware family. The behavior pattern should capture two of the most important metrics of the program: the invocation sequence of in-kernel functions and the arguments passed in. Following this, a pattern can be constructed by the combination of a Markov chain and data distances. The Markov chain is used to describe the probabilistic transition model of the in-kernel functions and the similarity of the arguments is measured. In the recognition phase, the given suspicious program is executed inside the profiling emulator to collect its in-kernel function invocations as its behavior profile, which will be matched against patterns of those known rootkit families.

Figure 1:
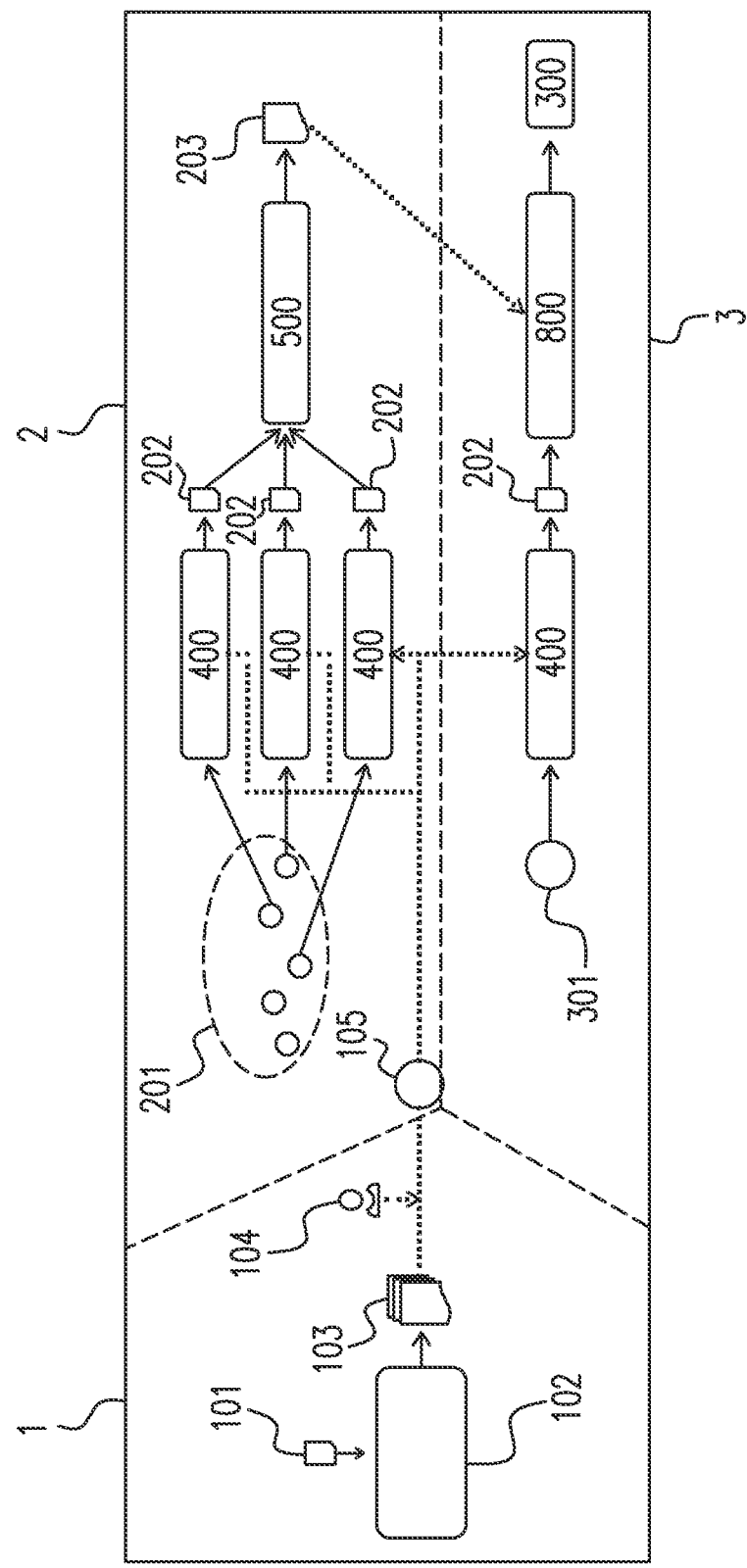
FIG. 1 shows the system architecture according to an embodiment of the present invention.

In FIG. 1, an overview flow chart is shown. As shown in FIG. 1, the system operation can be separated into pattern training phase 2 and recognition phase 3. Both phases rely on BehaviorProfiler 400 to dynamically execute the to-be-tested programs and collect their in-kernel function invocation traces. In training phase 2, the to-be-tested program is a known malware program 201 whose in-kernel function invocation traces 202 are collected, whereas in the recognition phase 3, the to-be-tested program is an unknown program 301. In pattern training phase 2, traces of instances of known malware program 201 from the same malware family are fed into the PatternGenerator 500 to construct a pattern for later recognition. The pattern consists of an HMM to recognize the temporal pattern hidden in the invocation sequence of in-kernel functions and the normalized string patterns for argument similarity measurement. In recognition phase 3, the BehaviorProfiler 400 is used again to record the behaviors in kernel space invocated by the to-be-tested program. Finally, PatternRecognizer 800 is responsible for evaluating the deviation of the collected traces from patterns of families.

To avoid being detected by the malware, the monitoring functionality should be implemented with so-called "out-of-box" hooking. Specifically, the code to capture the in-kernel function invocation traces and their arguments should be implemented in a Virtual Machine Monitor (VMM), and thus the program running inside the guest operating system is unobservable to the malware.

As shown in FIG. 1, the present invention further includes Pre-Analysis Phase 1 before Pattern Training Phase 2 and Pattern Recognition Phase 3 to provide a method to automatically identify the hookpoint candidates 103 so that the system analyst can choose suitable hookpoints 105 from the set of hookpoint candidates.

Figure 2:
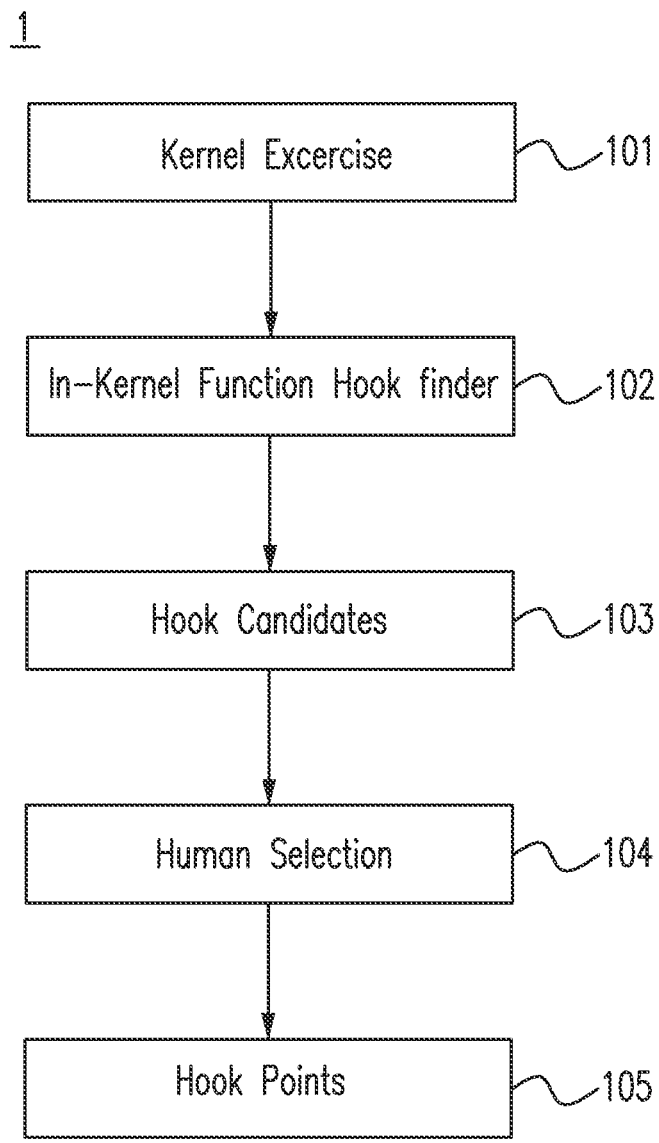
FIG. 2 is the flowchart for the Pre-Analysis Phase.

The process flow of the Pre-Analysis Phase 1 is shown in FIG. 2, which includes the following steps: exercising the kernel in the emulator, and inputting the collected set of instructions for accessing memory regions containing an argument S into HookFinder (step 101); establishing the instruction access path as the hookpoint candidate via Hook-Finder (step 102); outputting a set of hookpoint candidates (step 103); the system analyst selecting the suitable hookpoints from the set of hookpoint candidates (step 104); and outputting the suitable hookpoints to cause BehaviorProfiler 400 to do the behavior profiling.

Kernel exercise means repetitively commanding the system to perform certain tasks such as packet sending and file opening, and the HookFinder automatically identifies the instructions that access memory regions by using the argument data (e.g. the packet content or the file I/O buffer). For each identified instruction, a backward-slicing procedure is applied to the pointer variable to check whether a stable sequence of pointer-dereferencing steps exists. If so, the locations of the head instruction in the backward slice and the associated pointer structure are collected.

The goal of HookFinder is to discover suitable kernel functions wherein to place checkpoints to profile certain behaviors. To achieve this goal, we exercise the kernel to record the execution paths. For instance, to place a hook which monitors file system I/O operation, a program is executed to write and read a file in the user space. To further refine the execution path, the process is repeated multiple times to eliminate the nodes with random occurrences. However, the execution path will still contain too many code blocks for choosing.

In addition, not all nodes in the execution path collected from the above procedure are suitable for hooking. Although obtaining such a checkpoint leads to behavior detection, to construct a complete behavior profiling system requires more than that. Let's use the file system I/O as an example again. In a file I/O operation, in addition to its occurrence, we are more interested in determining the file being accessed. For a write operation, the data being written are also of interest. Capturing the information on an upper abstraction layer such as an API and system call is not an issue; however it is difficult to do so in the kernel of a closed-source OS kernel.

An example of a data path from the stack frame pointer to a member field of a data structure is shown below.

```
; START OF FUNCTION CHUNK FOR _NtQueryValueKey
loc_4ABF29 :
  mov eax, [ebp+0xC]
  mov ecx, [eax]
  mov dword ptr [ebp+String1.Length1], ecx
  mov eax, [eax+4]
  mov [ebp+String1.Buffer], eax
  mov edi, [ebp+ResultLength]
  jmp loc_49C049
   ; END OF FUNCTION CHUNK FOR_NtQueryValueKey
```

The member is not located in the stack, but in a data object allocated on the heap. Yet, the pointer to the data object is stored on the stack, and it should be referenced by [ebp+0xc]. This is merely a trivial case illustrating the idea of a data path. In compounded or chained data structures, the data path to important data can be much more complicated. Figuring out these data paths is necessary because they are valuable information for behavior profiling.

Algorithm 1 shown below describes the procedure of HookFinder.

Algorithm 1: HookFinder

Requires:
A string pattern S
Depth limit D
1  In the guest OS in the emulator, invoke a user-level API f(...,S,...)
2  The emulator collects a set E = {(e,i) | the instruction, i, on e accesses memory region containing S}
3  foreach (e,i) ∈ E
4    d ← 0 , p ← <,>
5    while d < D
6      if i matches format "mov rd, [rs + offset]"
7        p ← <offset> ‖ p
8        if rs ∈ {ESP, EBP}
9          p ← <rs> ‖ p
10         break
11       else
12         d ← d + 1
13         i ← Perform backward-slicing on source operands of i
14       if i = Nil
15         break
16    if d < D ∧p[0] ∈ {ESP, EBP}
17      output p The procedure starts with executing an upper-layer API call, say f, in the guest system. In addition, the argument of interest is intentionally given a special string S. For instance, the file path of the OpenFile( ) API will be the ideal argument to use. Or, the data buffer of the WriteFile( ) API is also suitable. After the API is successfully invoked, the guest OS kernel will execute the task, and the emulator will examine each executed instruction, searching for those that access the memory containing the string pattern S. The above two procedures are described on lines 1 and 2 of Algorithm 1. The string pattern S is devised so that it is so unique that no other data in the guest OS matches it. The above two steps effectively eliminate instructions that are irrelevant to the subject behavior and quickly reduce the problem size.

For each instruction collected into E, lines 4-15 perform backward slicing on the register addressing the source memory operand. On line 4, the depth-indicating variable d is initiated at zero and the list structure p is emptied. Line 5 checks if the current depth has exceeded the depth limit D. This limit is based on the assumption that a usable data path should have limited lengths. This is due to the programming convention that only necessary data should be passed into functions as input variables. Note that the assumption above does not deny the existence of long data referencing paths since walking a linked list can easily lead to a quite long series of referencing steps. However, such paths are not static and hence cannot be used in our application. Line 6 checks if the instruction uses an index pointer to address its memory source operand. If so, the immediate offset is inserted into p. The process stops when the stack pointer or the frame pointer is reached, because they usually point to the base address of the activation record of routines. Line 13 performs backward-slicing on the instruction, looking for the last instruction modifying the source operand of instruction i. Output p is the list of hookpoint candidates for the system analyst to select suitable hookpoints.

Figure 3:
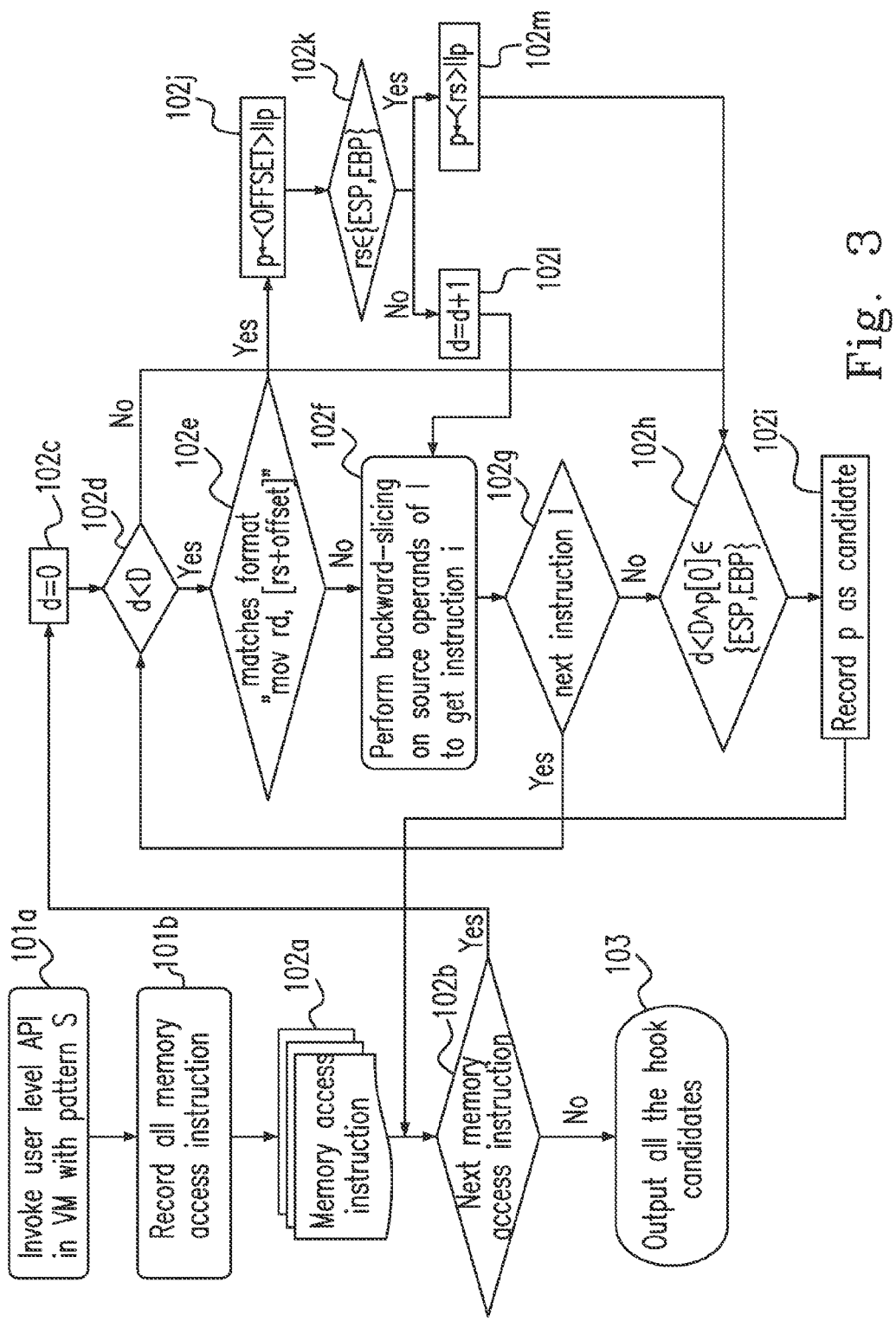
FIG. 3 is the flowchart for HookFinder.

It is easier to understand the function of HookFinder with reference to the HookFinder flow chart, which is shown in FIG. 3. The flow chart includes the following steps:

step 101a: invoke a user level API in a Virtual Machine with a string pattern S;

step 101b: record all memory access instructions;

step 102a: obtain a set of memory access instructions;

step 102b: check whether the next memory access instruction exists; if this is true, execute step 102c; if else, execute step 103;

step 102c: initialize the depth variable d at 0;

step 102d: check whether d is less than the maximum depth value D; if this is true, execute step 102e; if else, execute step 102h;

step 102e: check whether the instruction i matches a specific format; if it this true, execute step 102j; if else, execute step 102f;

step 102j: insert the offset value into p;

step 102k: check whether the source operand is a stack pointer or a frame pointer; if this is true, execute step 102m; if else, execute 102l;

step 102m: record the memory address of the source operand in p;

step 102l: increase the value of the depth variable by 1, and execute step 120f;

step 102f: perform backward-slicing on source operands of I to get instruction i;

step 102g: check the existence of the next instruction I; if this is true, execute step 102d; if else, execute step 102h;

step 102h: if the value of depth variable d is less than the value of the maximum depth D and p[0] is a stack pointer or a frame pointer, execute step 102i;

step 102i: record p as a hookpoint candidate; repeat step 102c to step 102m until there are no more instructions; execute step 103; and step 103: output all of the recorded hookpoint candidates.

As shown in FIG. 1, the BehaviorProfiler 400 is a major component deployed in both training phase 2 and recognition phase 3. It serves to generate the behavior trace 202 of the subject program. The BehaviorProfiler 400 is constructed by installing the hooks 105 collected in the pre-analysis phase in the whole-system taint tracker, which propagates taint across CPU registers, memory, and hard disks. The profiling process begins with importing the subject program onto the hard disks of the guest system, and the sectors occupied by this imported file are tainted as the source of contamination. Following this, the subject is executed and hence the tainted information will be propagated through out the system. Once a hook is hit by the execution, its data path is walked through to check whether it reaches tainted information.

Figure 4:
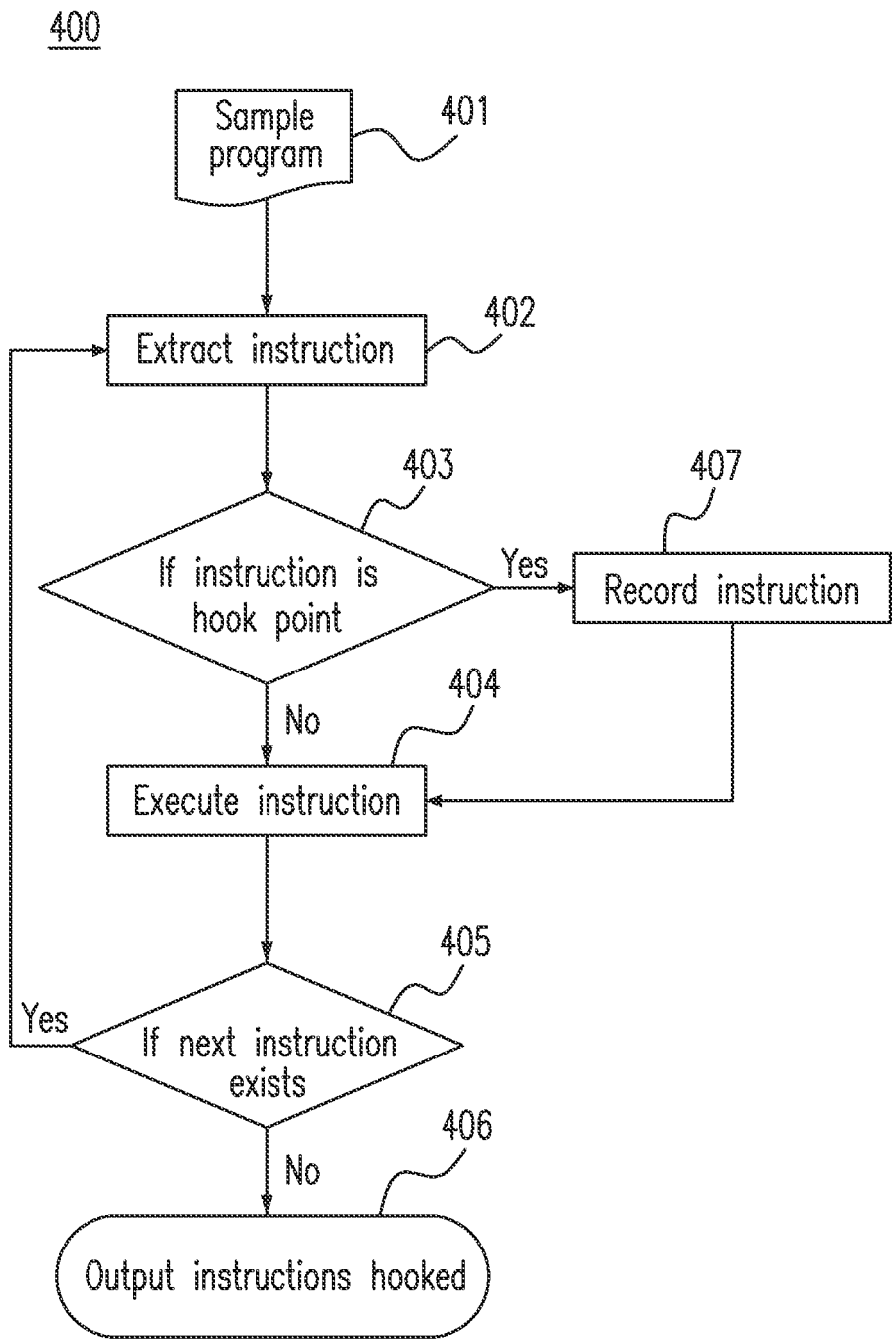
FIG. 4 is the flowchart for BehaviorProfiler.

Please refer to FIG. 4, which shows the flow chart of BehaviorProfiler 400. The process flow includes the following steps:

step 401: provide a to-be-tested program;

step 402: extract the in-kernel instructions;

step 403: check whether the instructions invoke a hookpoint; if this is true, execute step 404; if else, execute 405;

step 404: record the in-kernel instruction;

step 405: execute the in-kernel instruction;

step 406: check for the existence of the next instruction; if this is true, execute step 402; if else, execute step 407; and step 407: output the hooked instructions.

A hook H is defined as a 3-tuple $H=(n, loc_H, IT_H)$, where $loc_H$ is a memory address and $IT_H$ is an ordered sequence of 2-tuple $(I^H_k, T^H_k)$ for $1 \leq k \leq n$. Each $I^H_k$: States$\rightarrow \{0,1\}^*$ are a function maps of a machine state S to a binary string $\omega$. Specifically, it extracts certain information according to the register, memory, and taint status of state S. Each $T^H_k$ is an element in the type collection T specifying how the output of $I^H_k$ should be interpreted in later analysis. Therefore, when a hook $H=(n, loc_H, IT_H)$ is triggered, a sequence of binary strings $(IH_1(S), IH_2(S), \ldots, IH_n(S))$ will be generated respectively from the machine state S. We define a behavior B profiled by a hook H at state S as a 3-tuple $(loc_B, type_B, data_B)$, where $loc_B = loc_H$, $type_B = (T^H_1, T^H_2, \ldots, T^H_n)$ and $data_B = (I^H_1(S), I^H_2(S), \ldots, I^H_n(S))$. For simplicity, from now on we will denote the k-th element in $type_B$ and $data_B$ as $type_B[k]$ and $data_B[k]$ respectively.

The type collection T is a finite set defined heuristically. To achieve generality, elements of T should be platform-independent while preserving maximal semantics because this will provide clues for later data processing. In our design we define T as {bitmap,u8,u16,u32,text,path,raw,random}

The bitmap type indicates that the data should be viewed as a vector of individual bits, which are generally used in simultaneously expressing states of multiple Boolean variables. The type u8, u16, and u32 stand for unsigned integers of 8-bit, 16-bit, and 32-bit data size respectively. A text is a sequence of readable characters with a length less than 128. To capture all the data used to express a path in tree-like structures such as file paths or the Windows registry are classified into the type path. Entries which cannot be classified into any categories listed above are treated as raw data.

The type random is a very special attribute attached to the data that are generated or mixed with random numbers. For example, the source port of a TCP or UDP connection is usually picked randomly by the system. Due to their randomness, they have a negative impact on the learned behavior model. Therefore, it is necessary for us to filter out these meaningless data. To achieve this, the present invention locates the pseudo random number generator in the system, and taints its output with this special tag. The taint propagation ensures that data calculated from the random numbers can be distinguished from ordinary data.

Table 1 shows an excerpt from the profiled behaviors of the adware zenosearch.

TABLE 1

| loc | Data | Type |
|---|---|---|
| 1 | 0x0a00020f | u32 |
|  | 0xa85f0101 | u32 |
|  | 0x0402 | u16 |
|  | 0x0035 | u16 |
|  | " . . . 0x010x000x000x000x000x000x03 www 0x09 think-adz 0x03 com 0x000x000x01 . . . " | Raw |

TABLE 1-continued

| loc | Data | Type |
|---|---|---|
| 2 | "C:\WINDOWS\system32\dbglogfolder\ n_inst_05_01_11.log" | Path |
| 3 | "REGISTRY/USER/S-1- . . . 1003/SOFTWARE/ MICROSOFT/WINDOWS/CURRENTVERSION/INTERNET SETTINGS" | Path |
|  | "EnableAutodial" | Text |
|  | "0x060xae0xc8" | Raw |
| 1 | 0x0a00020f | u32 |
|  | 0x48378cb8 | u32 |
|  | 0x0403 | u16 |
|  | 0x0050 | u16 |
|  | "GET /instreport8_2.asp?uid=0 HTTP/1.1Ox 0dOx0aUser-Agent: [ELT001]52-54-00-12-34- 56:99-9E-E4-4C-:0:WinXP Pro Service Pack 3mj_5_mn_1Ox0dOx0aHost: www.think-adz. comOx0dOx0aCache-Control: no-cacheOx0dOx 0aCookie: ASPSESSIONIDCQCSCABR=JMDDJNICM LFCPJJEJEOMKAHHOx0dOx0aOx0dOx0a" | Raw |

Each behavior B is presented in three columns: $loc_B$, $data_B$ and $type_B$. Note that the loc is substituted with merely a unique ID because the address itself is not meaningful. However, it is quite easy for us to "guess" which kind of information is processed by the codes near $loc_B$ by observing $data_B$ only. The adware performs DNS lookup for the name "www.think-adz.com", tries to access a file named "n_inst_05_01_11.log", writes data into the registry, and then issues an HTTP query. Note that all this information are acquired in the kernel space when zenosearch is executed as a user-level application.

In the framework above, hook H serves the most important purpose for extracting information from the machine state. Therefore, HookFinder 102 is a powerful assistance tool for system analyst to do reverse engineering.

Given a set of known malware in the same family, PatternGenerator 500 tries to build a model for that family. The control flow transition and the data characteristics are both powerful metrics for recognizing program behavior, and hence they should both be captured. In addition, the model should be able to assign a probability to a subject program so that the model predicts the probability that a subject belongs to that specific family.

PatternGenerator 500 attempts to group behaviors with similar arguments together. By viewing each cluster as a state, the original sequence of profiled behaviors can be transformed into a sequence of transition between states, and a Markov chain can therefore be generated. To capture the execution context, a Markov chain is used to model the transfer probability between the hooks. An intuitive idea is to associate each $loc_H$ with a state of the Markov chain. In this way, a sequence of behaviors can be viewed as a path in the chain by consequently walking through those states specified by $loc_B$, and the transition probability matrix states can therefore be trained. However, the approach stated above neglects the fact that even a single function may provide different functionalities when different arguments are given. Therefore, associating a $loc_H$ with only a single state may lead to an inaccurate model.

To provide a better recognition rate, we further partition those behaviors with the same $loc_B$ into smaller groups based on their argument similarity. The partitioning is done with the agglomerative, complete linkage clustering algorithm, which progressively groups elements in a bottom-up way. The algorithm will be described briefly without going into detail because it is a well-known technique for data clustering. Before applying the algorithm the distance function d to measuring the similarity between any two objects in the group, a threshold δ specifying the stopping criterion must be determined. The clustering begins with forming a singleton for each element. The distance between any two clusters X and Y is given by max(d(x, y)) where x∈X and y∈Y. The process continuously joins two clusters if the distance between them is less than δ. The value of δ determines how similar the elements in the same cluster will be, and it hence affects the quality of the learned model.

It is clear that the characteristic of the distance function has a direct influence on the quality of the partition. The following formula is used to measure the distance between the two behaviors $B_1$ and $B_2$.

$$D(B_1, B_2) = \sum_{k=1}^{n} w_k \times d_{(type[k])}(data_{B_1}[k], data_{B_2}[k])$$

where $w_k$ are weighting constants defined heuristically in the range (0, 1), and satisfy $w_1+w_2+ \ldots +w_k=1$. Note that we do not discuss the distance between different types because our goal is to partition those behaviors with the same $loc_B$ into smaller groups. Because given a $loc_B$, its $type_B=(T^H_1, T^H_2, \ldots, T^H_n)$ is uniquely determined, the distance will be measured only between two elements with the same type. As previously stated, there are seven possible attributes for $data_B$: bitmap, u8, u16, u32, text, path, and raw. For each of these, we define the distance function $d_{(type)}$, which measures the distance between behaviors $B_1$ and $B_2$. Note that we do not discuss the distance between different types of $type_B$ because our goal is to partition those behaviors with the same $loc_B$ into smaller groups.

The following sections describe different types of $type_B$ in detail.

Bitmap: Data labeled with this attribute are used as flags or attributes such as file opening modes. The purpose and meaning are assigned to each bit in the sequence. In addition, the bit sequence usually has a fixed length. Therefore, the hamming distance function is a good metric for measuring the number of bits varying in the two binary strings. To normalize the result, the hamming distance is divided by the length of the bit sequence.

$$d_{bitmap} = \frac{\text{The hamming distance}}{\text{The length of the bitmap}}$$

u8, u16, and u32: Numeric values in which an ordering relation is maintained are attributed with these types. Because they can be viewed as points residing on the line of real numbers, the most natural way to define their distance would be:

$$d_{u_n}(x, y) = \frac{|x - y|}{2^n}$$

Although numeric values may not be used as real numbers, in most cases they still maintain certain ordering relations and justify the meaning of the above formula. For example, the distance between the IP address 64.233.171.18 (Google web server) and 64.233.179.19 (another Google web server) is intuitively smaller than the distance between 64.233.171.18 and 220.181.6.6 (a Baidu web search engine server in China) due to the geographical difference between the machines holding these addresses. Another important kind of data, which possess good characteristic of real numbers, is time-related values. To ensure the consistency among profiles, the system time of the emulator is adjusted to a fixed instant every time before profiling a subject. Note that those data originating (even partially) from a random number generator have been filtered out by the Behavior-Profiler 400 as stated previously.

Text and Path: To compare the difference between two human-readable strings, the Levenshtein distance, which is usually referred to as the edit distance, is widely adopted. The distance is defined as the minimum number of edit operations needed to transform the original string to another. However, it is obvious that two strings of length 10 differing in 1 bit show more difference than two strings of length 1000 differing in only 3 bits. Therefore, it is necessary to normalize the edit distance by taking the string length into account. To this end we adopted the normalized edit distance proposed by Marzal et al. In their work, the normalized edit distance is acquired by minimalizing the average cost spent by each step in the edit path. Also, their algorithm works in $O(m \cdot n^2)$, where m and n stand for the length of strings, and $n \leq m$. Since only the data of lengths less than 128 should be attributed to the type Text, the computation is still acceptable. However, data labeled as Path, such as a pathname or a registry entry, could be too long to compute the distance efficiently. To accelerate the distance computation, we substitute the substring of each level in the path with a 32-bit CRC value computed from them. For example, the string "/Program Files/Microsoft Office" will be transformed to "/\x10\x97\xE8\x4A/\xC2\xDC\xC7\x7E" before being fed into the normalized edit distance calculator.

Raw: Due to performance issues, we do not consider the content-aware method to compute the distance between data larger than 128 bytes. In our approach, these data are compared with a conventional but effective metric, which is the Jensen-Shannon divergence. With the occurrence frequency of each of the 256 possible byte patterns computed, the Jensen-Shannon divergence measures the similarity between two probabilistic distributions.

Figure 5:
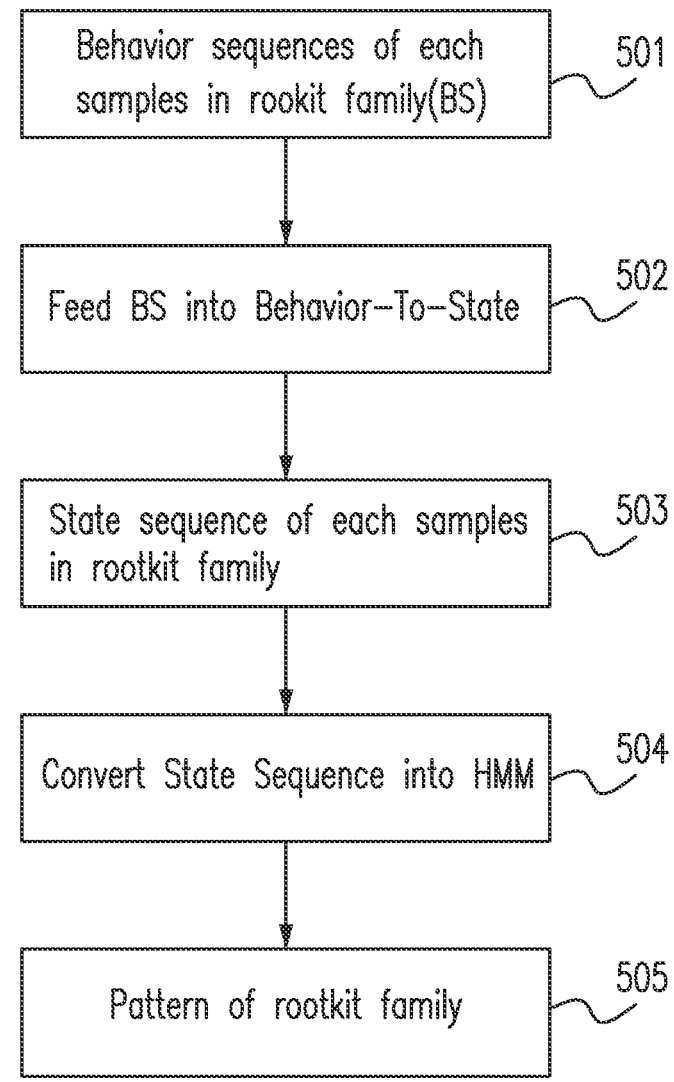
FIG. 5 is the flowchart for PatternGenerator.

The flow chart for Pattern Generator 500 is represented by FIG. 5, including the following steps:

Step 501: input the behavior sequence (BS) of the known malware samples belonging to the same rootkit family;

Step 502: feed the BSs into the Behavior-to-State 700 module to convert the BSs into State Sequences (SS);

Step 503: obtain the SSs of the known malware sample which belong to the same rootkit family from the Behavior-to-State 700 module;

Step 504: obtain the Hidden Markov's Model for the known malware samples from the same rootkit family with the SSs obtained from step 503; and Step 505: obtain the pattern of the rootkit family.

Figure 6:
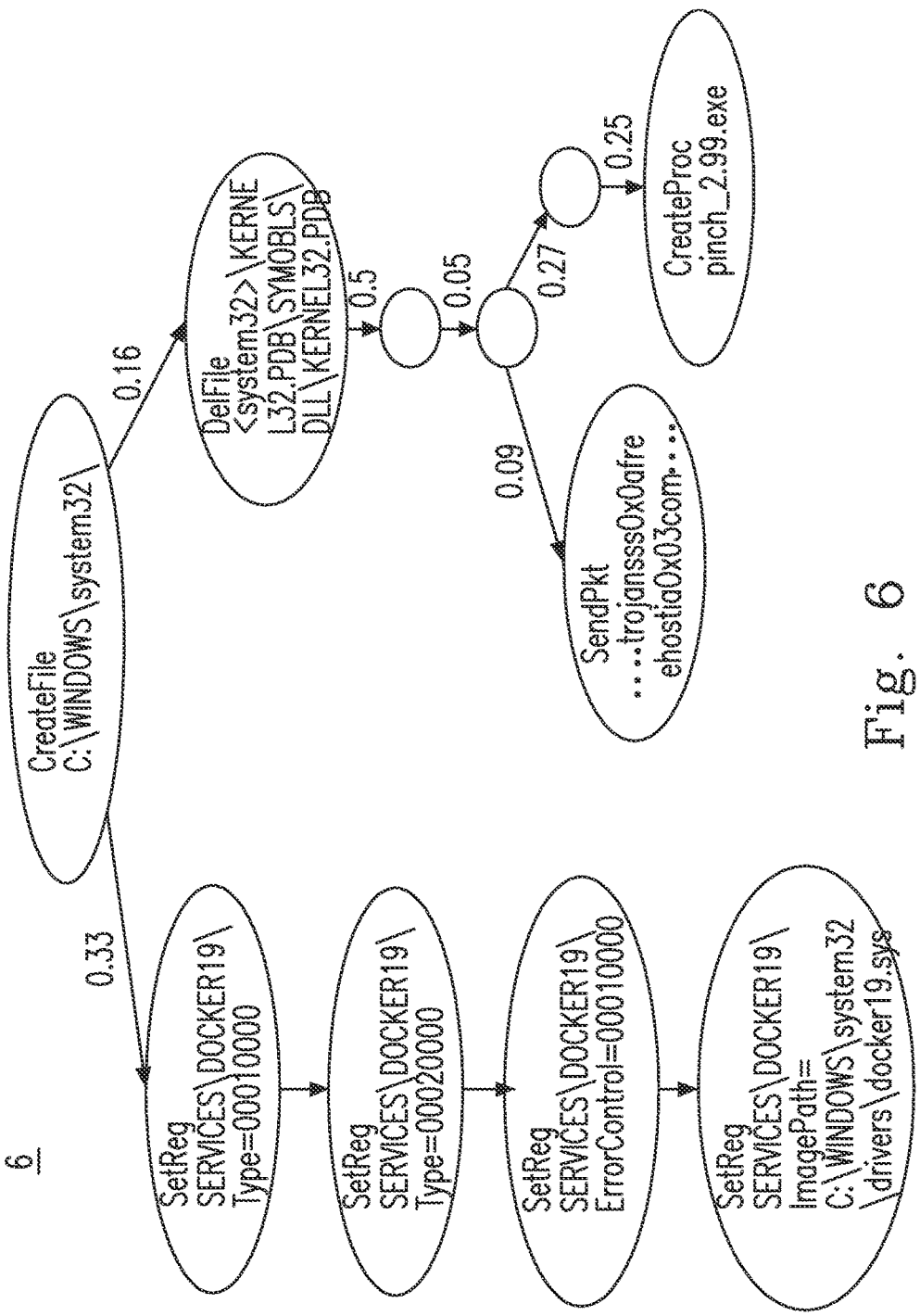
FIG. 6 is a portion of the HMM model of a known malware sample.

Srizbi is one of the world's largest botnet viruses. With the capability to hide itself at both user and system level, it is difficult to remove or detect Srizbi. Because Srizbi only executes in kernel mode, it can make its files and network traffic invisible and bypass conventional malware detection methods. FIG. 6 shows a portion of the HMM model of Srizbi generated by PatternGenerator 500. Each node is a clustered state, and the string inside the node is the data selected as the centroid for that cluster. On each edge the transition probability is also listed. In the model, we can observe the three major types of captured behaviors: registry modification, packet transfer, and process creation. As shown, the transition probability between the sequential registry modifications is 1. This matches the convention that registering a program as a system service requires setting up multiple registry entries.

Behavior-to-State 700 converts the behavior sequences of the to-be-tested program into the state sequences. The algorithm converting behaviors to state transitions is listed below in Algorithm 2

---
Algorithm 2 Behavior-To-State
---

Input:
    BS: A set of sequences of behaviors.
Output:
    n: The number of states.
    SS: A set of sequences of states
    R: $<r_1, r_2, \ldots, r_n>$ is a list of representative behaviors.
Behavior-To-State(F)
1    H ← A key-value map (mapping an address to a set of behaviors)
2    C ← A key-value map (mapping a behavior to an integer)
3    n ← 0, r ← {}, SS ← {}
4    foreach sequence s ∈ BS
5        foreach behavior b ∈ s
6            $H[loc_b]$ ← $H[loc_b] \cup b$    // Grouping behaviors by $loc_b$
7    foreach value h ∈ H
8        cl ← Complete-Link-Cluster(h)    // cl contains sets of behaviors
9        foreach c ∈ cl
10          foreach b ∈ c
11              C[b] ← n
12          $r \leftarrow$ pick b out of c $\sum_{b' \in c} D(b, b')$ b minimizes
13        append r to R
14        n ← n + 1
15    foreach sequence s: $<b_1, b_2, \ldots, b_k>$ ∈ BS
16        append $<C[b_1], C[b_2], \ldots, C[b_k]>$ to SS
17    return n, SS, R

---

A set of sequences of behaviors BS, which are acquired by profiling executions of malware known to be in the same family, is fed into the Behavior-To-State procedure as the input. Line 4-6 groups all behaviors with the same $loc_b$ together so that the clustering is done on behaviors profiled by the same hook. Using the distance functions defined in previous paragraphs, the complete-linkage clustering algorithm invoked in line 7-8 further clusters behaviors from $loc_b$ according to their argument similarity. In line 9-14, the algorithm assigns an integer n to each group acquired by clustering as its state number. In addition, behaviors belonging to the same group are labeled with that number. The mapping is recorded in the key-value map C. Lines 15 and 16 convert each sequence of behaviors s∈BS to a sequence of states by replacing each $b_k$ ∈s with $C[b_k]$.

With sequences of states SS in hands, it is trivial to learn the Markov transition probability matrix from them. However, using only the Markov chain itself is not enough. In the recognition phase, a behavior profile, which is simply a sequence of behaviors, say bp, will be matched against a Markov chain generated by PatternGenerator 600. Therefore, the matching can only be performed after each behavior in bp has been mapped to states in the chain. To this end, we generate a centroid for each group acquired in the cluster by choosing the element which minimizes its distance summation to all other elements in that group. Behaviors in bp are compared with these centroids, and thus appropriate states can be found. Line 12 and 13 are responsible for the task above, and the resulted centroids are preserved in R.

Figure 7:
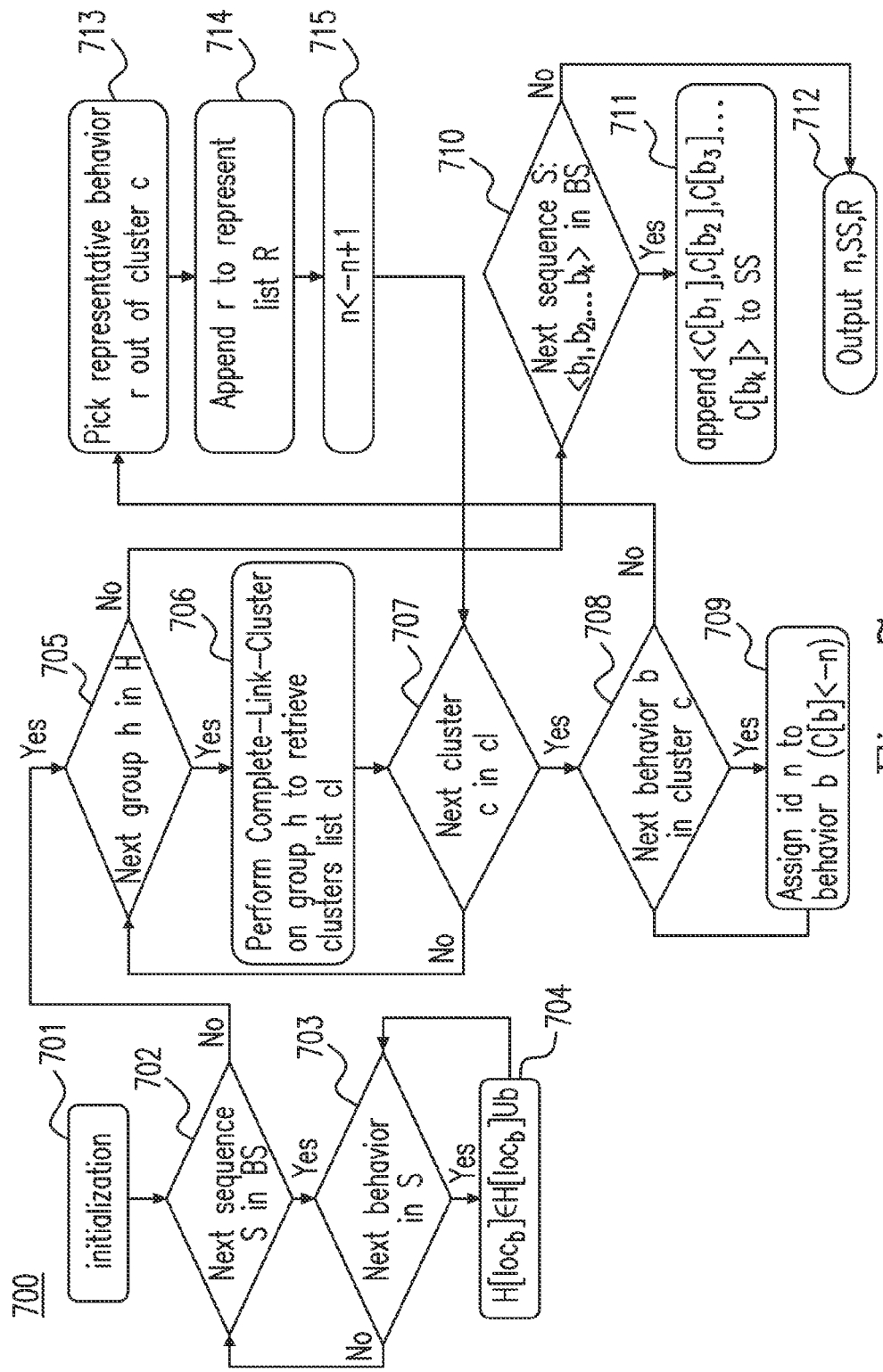
FIG. 7 is the flowchart for Behavior-to-State.

FIG. 7 is the flow chart for Behavior-to-State 700. The process includes the following steps:

Step 701: initialize;

Step 702: check for the existence of the next sequence S in BS; if this is true, execute step 703; if else, execute step 705;

Step 703: check for the existence of the next behavior b in the sequence s; if this is true, execute step 704; if else, repeat step 703;

Step 704: group the behaviors b by $loc_B$;

Step 705: check for the existence of the next group h in the group H; if this is true, execute step 706; if else, repeat step 710;

Step 706: perform Complete-Link-Cluster on group h to retrieve cluster list cl; execute step 707;

Step 707: check for the existence of the next cluster c in cluster list cl; if this is true, execute step 708; if else, repeat step 705;

Step 708: check for the existence of the next behavior b in the cluster c; if this is true, execute step 709; if else, execute step 713;

Step 709: assign identification number (id) n to behavior b; repeat step 709 until there is no behavior b in cluster c;

Step 713: choose the representative behavior r out of cluster c;

Step 714: append r to the representative list R;

Step 715: increase id d by 1;

Step 710: check for the existence of the sequence s <$b_1$, $b_2$, $b_3$, ... $b_k$> in the behavior sequence BS; if this is true, execute step 711; if else, execute step 712;

Step 711: append <C[$b_1$], C[$b_2$], ..., C[$b_k$]> to SS; and

Step 712: output the state sequence list, which consists of n, SS, R.

The task of PatternRecognizer 800 is to generate the profile of behaviors of a subject program, and to evaluate its deviation from patterns of known malware families. The profiling mechanism is completely the same as the BehaviorProfiler 500, which was introduced previously. In the following paragraphs, the way that the behavior profile, which is a sequence of actual behaviors, can be matched against the pattern generated by PatternGenerator 600, will be discussed.

With the state sequences SS acquired from Behavior-to-State 700, a Markov chain M can be immediately derived. Together with the centroids R, the 3-tuple (n, M, R) can give a matching score to a given sequence of behaviors. This procedure is listed in Algorithm 3

---

Algorithm 3 Calculate-Matching-Degree

---

Input:
    B : A sequence of behaviors.
    m : A 3-tuple (n, M, R), where n is the number of states,
        M is the Markov transition matrix, where $M_{0,k}$ preserves
        initial probability of state k.
        R = <$r_1$, $r_2$, ..., $r_n$> is the list of centroids.
Output:
    p: A value in (0,1) indicating the matching degree between b and m
Calculate-Matching-Degree (B, m)
1    p ← 0, j ← 0, l ← 0
2    foreach b ∈ B
3        k ← 0, s ← δ
4        for i ← 1 to n
5            d ← D(b, $r_i$)
6            if d < s then
7                s ← d, k ← i
8        p ← p . $M_{j,k}$
9        j ← k
10       l ← l + 1
11   return $p^{(1/l)}$

---

This probability calculation basically follows the procedure of evaluating the probability of a state sequence. For each behavior, the distance between the behavior and every centroid in R to figure out which state generated to that behavior is calculated in lines 3-8 of the algorithm. In line 9, the transition probability is accumulated. In the end, the geometric mean of the cumulated product is returned as the output.

The distance between the behavior and its closest centroid could still be larger than the threshold δ. Because no appropriate state can be found for such behaviors in the matched pattern, they should be considered as a total deviation from that model. In such a case, the index k remains at its initial value 0, which is assigned on line 3. Therefore, before the algorithm starts, we search for the smallest value in the matrix M and replace all elements $M_{k,0}$ with it for all 1≤k≤n. Behaviors where the arguments present huge deviation from that model will attenuate the value of the final output.

After obtaining p, it is possible to evaluate which pattern of the known malware family the behavior of the to-be-tested program matches the most, and it is possible to determine whether the to-be-tested program is a malicious program. If the value of p is close to 0, the to-be-tested program is determined to be a benign program. If the value of p is close to 1, the to-be-tested program is determined to be a malicious program.

Figure 8:
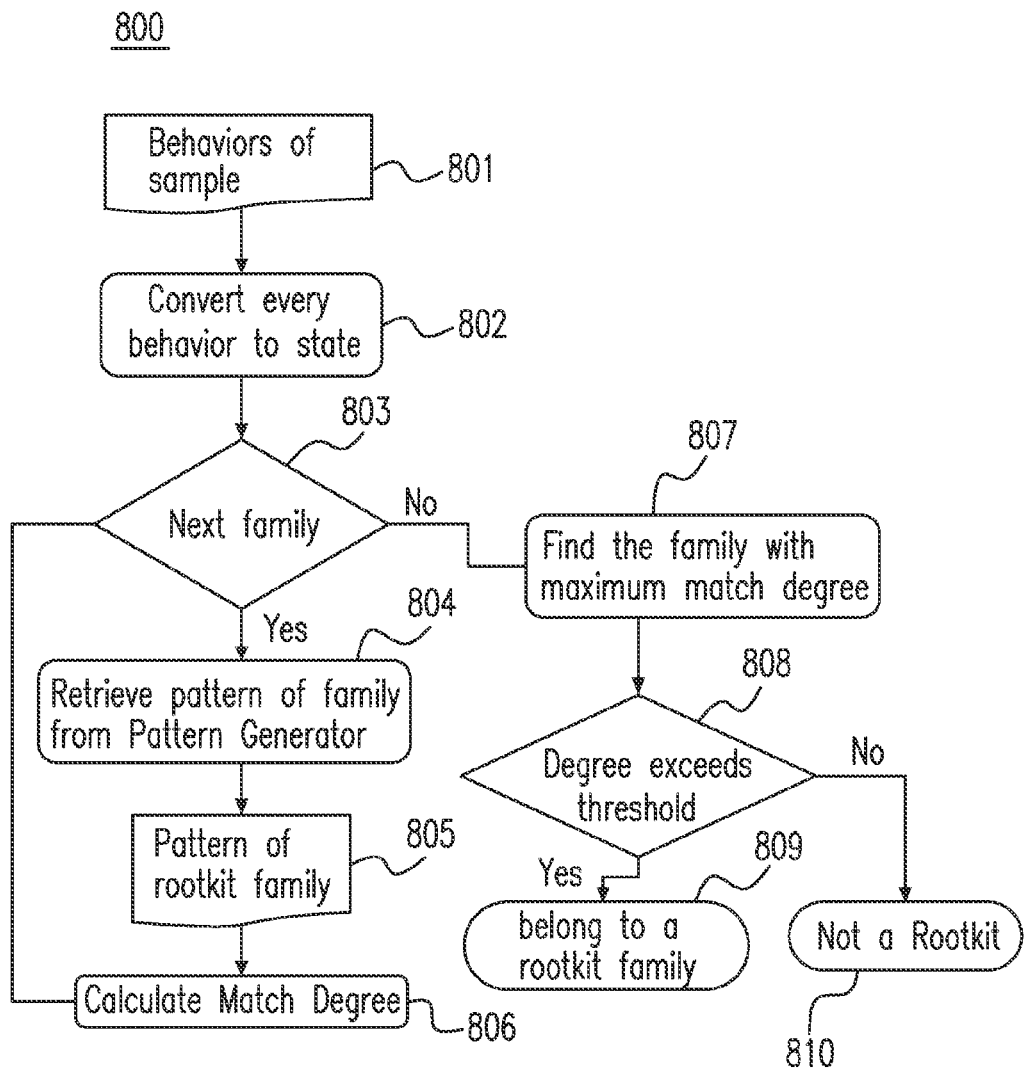
FIG. 8 is the flowchart for PatternRecognizer.

The flow chart for PatternRecognizer 800 is shown in FIG. 8, which includes the following steps:

Step 801: input the behavior sequences of the to-be-tested program;

Step 802: convert the behavior sequences into state sequences;

Step 803: check for the existence of the representative pattern of malicious program families; if this is true, execute step 804; if else, execute step 807;

Step 804: retrieve the representative pattern of the malicious program family from PatternGenerator 500;

Step 805: obtain the representative pattern;

Step 806: calculate the matching score of the to-be-tested program with the representative pattern of the malicious program family;

Step 807: find the family with the maximum matching score;

Step 808: check whether the maximum matching score is higher than a threshold value; if this is true; execute step 809; if else, execute step 810;

Step 809: determine that the to-be-tested program is a malicious program and it belongs to a rootkit family; and Step 810: determine that the to-be-tested program is not a malicious program.

Figure 9:
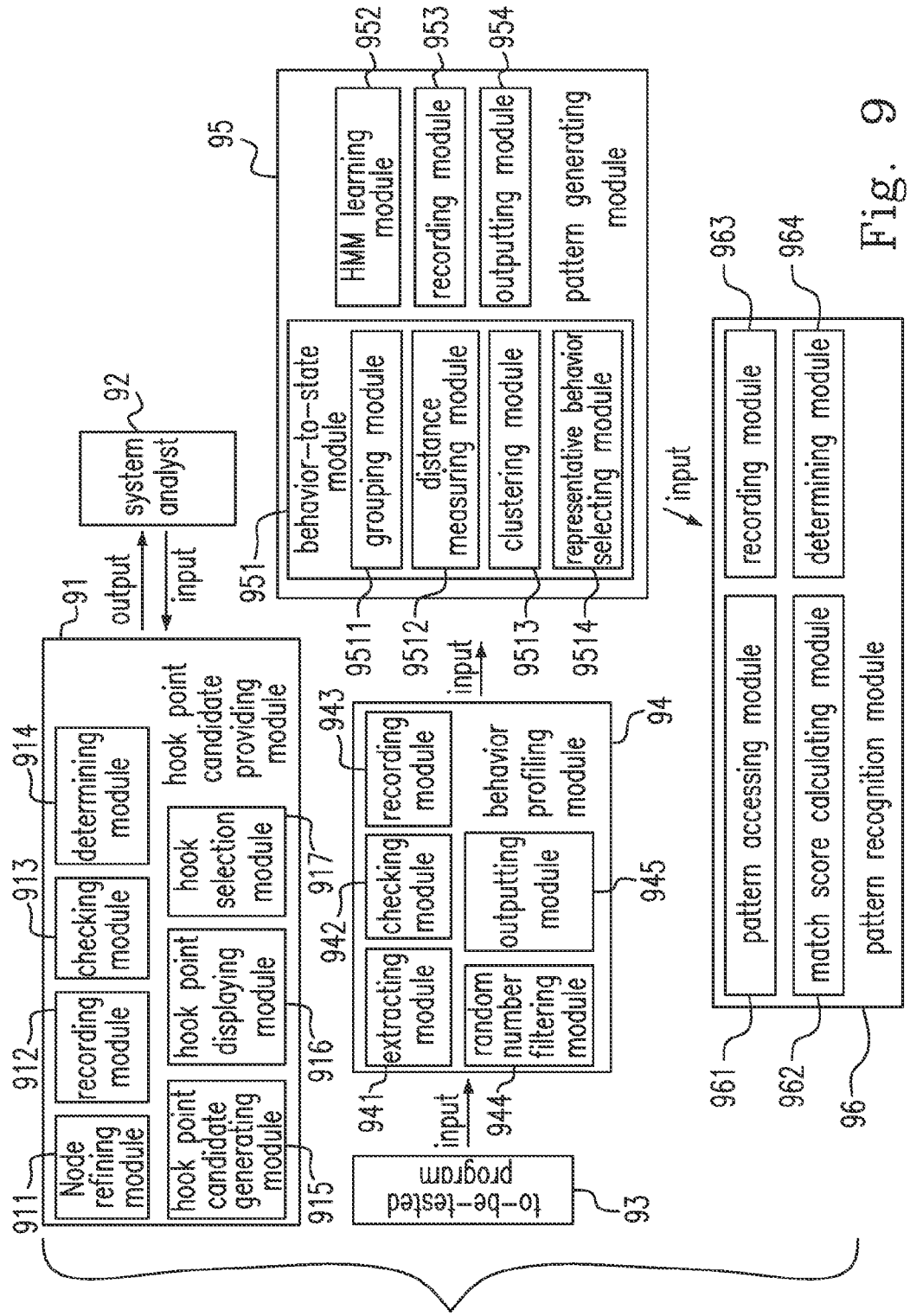
FIG. 9 shows the system according to an embodiment of the present invention.

FIG. 9 shows the system according to one embodiment of the present invention. The system includes a Hook Point Candidate Providing module 91, a Behavior Profiling module 94, a Pattern Generator module 95 and a Pattern Recognition module 96.

The Hook Point Candidate Providing modules 91 includes a Node Refining module 911, a recording module 912, a checking module 913, a determining module 914, a hook point candidate generating module 915, a hook point displaying module 916 and a hook selection module 917. The Node Refining module 911 executes a known API program multiple times to eliminate any random nodes. The recording module 912 records all the instructions executed by the API program at the kernel level. The checking module 913 checks whether at least one kernel function sequence invoked by the plurality of instructions points to a memory address containing a specific argument. The determining module 914 determines that the API program contains malicious intent by checking whether the memory address pointed to the at least one kernel function sequence contains a hook point of the malicious program according to the specific argument. The hook point candidate generating module 915 generates and outputs a plurality of hook point candidates for the user 92 to use to select suitable hook points. The hook point displaying module 916 displays the hook point candidates on the display device so that the system analyst 92 can select suitable hook points. The hook selection module 917 receives the input from the system analyst 92 to select a plurality of hook points from the plurality of hook point candidates and records the selected suitable hook points.

The behavior profiling module 94 receives the suitable hook points and installs them at the kernel level. After the installation is done, the behavior profiling module 94 receives and executes a to-be-tested program 93 to produce a behavior sequence. The behavior profiling module 94 includes an extracting module 941, a checking module 942, a recording module 943, a random number filtering module 944 and an output module 945. The extracting module 941 extracts all the instructions generated by the to-be-tested program 93. The checking module 942 checks whether the instructions invoke the hook points. The recording module 943 records the instructions that have invoked the hook points. The random number filtering module 944 locates the pseudo random number generator in the virtual system, and taints its output with a special tag, and then the tainted output propagates through the whole virtual system in order to distinguish the data calculated from random numbers from the ordinary data and filters out the data paths that are generated from the random number. The output module 945 outputs the behavior sequence of the to-be-tested program 93.

The pattern generating module 95 receives the behavior sequence of the to-be-tested program to construct a statistical model. The statistical model models the transferring probability between the hooks to generate a pattern. The pattern generating module 95 includes a behavior-to-state module 951, an HMM learning module 952, a recording module 953 and an outputting module 953. The pattern generating module 95 converts a plurality of behavior sequences from the same hook point into a state sequence. The HMM learning module 952 inputs the state sequence to learn the HMM model of the to-be-tested program. The recording module 953 records the pattern of the to-be-tested program. The outputting module 954 outputs the pattern. The behavior-to-state module 951 further includes a grouping sub-module 9511, a distance measuring sub-module 9512, a clustering sub-module 9513 and a representative behavior selecting module 9514. The grouping sub-module 9511 groups the behavior sequences from one hook point as a group. The distance measuring sub-module 9512 measures the distance between the behaviors in the group. The clustering sub-module 9513 clusters similar behaviors in which the distance measured is less than a threshold, and assigns each cluster a unique state number. The representative behavior selecting module 9514 selects the behavior that has the least distance with all the other behaviors in the cluster as the representative behavior.

The pattern recognition module 96 receives the pattern of the to-be-tested program, accesses a plurality of malware family patterns, calculates the match score of the pattern of the to-be-tested program against all the malware family patterns, searches for the pattern of a malware family that has the maximum match degree with the pattern of the to-be-tested program, and determines whether the to-be-tested program is malware that belongs to a malware family if the match degree is greater than a threshold. The pattern recognition module 96 further includes a pattern accessing module 961, a match degree calculating module 962, a recording module 963 and a determining module 964. The pattern accessing module 961 accesses a plurality of patterns of malware families from the pattern generating module 95. The match degree calculating module 962 calculates the match degree between the pattern of the to-be-tested program and the pattern of every malware family. The recording module 963 records the match degrees and their corresponding malware families. The determining module 964 determines whether a to-be-tested program is a program with malicious intent by finding the highest match degree from the record and checking whether the value of the highest match degree is greater than a threshold. If the highest match degree is greater than the threshold, the to-be-tested program is determined to be a malware.

In conclusion, the present invention discloses a novel approach to profiling program behaviors with the invocation of the in-kernel function instead of user space APIs or system calls. Therefore, the present invention is able to deal with malware existing purely in the kernel-space such as Trojan.Srizbi, which cannot be analyzed by known antivirus software such as ThreatExpert or Anubis.

To distinguish events that actually originated from normal background activities, the present invention adopts a system-wide taint tracker to capture tainted arguments. This feature refines the collected data, and produces more accurate patterns for recognition.

An automatic module is devised to identify possible locations to place hooks. This feature greatly simplifies the work of hook developers.

Embodiments

1. A method for generating an in-kernel hook point candidate, comprising steps of: checking whether an in-kernel access instruction matches a specific format, wherein the in-kernel access instruction uses an index pointer and an offset value associated with the index pointer; recording the offset value of the in-kernel access instruction in an instruction list structure if the in-kernel access instruction matches the specific format; recording a memory address corresponding to the in-kernel access instruction in the instruction list structure and recording an initializing memory address of the instruction list structure as the in-kernel hook point candidate if the index pointer points to one of a stack pointer and a frame pointer; if the index pointer does not point to one of a stack pointer and a frame pointer, performing a backward-slicing operation on the instruction list structure if the in-kernel access instruction does not conform to either one of conditions of matching the specific format and pointing to one of the stack pointer and the frame pointer; and outputting the recorded initializing memory address of the instruction list structure as the in-kernel hook point candidate.

2. The method of Embodiment 1, wherein: the in-kernel access instruction includes a set of in-kernel instructions recorded on an access memory region; the set of in-kernel instructions is generated by collecting kernel function invocation sequences invoked by executing a program with certain behavior; and each in-kernel instruction contains a specific string pattern.

3. The method of Embodiments 1-2, wherein the program with certain behavior includes nodes of random occurrence, and the method further comprises a step of: executing the to-be-tested program dynamically more than once to eliminate the nodes in order to refine an execution path, wherein the execution path comprises the in-kernel access instruction for being checked in the checking step.

4. The method of Embodiments 1-3, wherein the program with certain behavior is executed dynamically in a guest OS (Operating System) kernel of an emulator.

5. A system for determining whether a to-be-tested program contains a malicious program, wherein the to-be-tested program includes nodes of random occurrence, the system comprising: a refining module executing the to-be-tested program multiple times to eliminate the nodes; a recording module recording a plurality of instructions executed by the to-be-tested program at a kernel level; a checking module checking whether at least one kernel function sequence invoked by the plurality of instructions points to a memory address containing a specific argument; and a determining module determining whether the to-be-tested program contains malicious intents by checking whether the memory address pointed by the at least one kernel function sequence contains a hook point of the malicious program according to the specific argument.

6. The system of Embodiment 5, further comprising: a hook point candidate generating module generating and outputting a plurality of hook point candidates for selection based on a known malicious program; a hook selection module receiving an input to select a plurality of hook points among the plurality of hook point candidates of the known malicious program; a behavior profiling module receiving and installing the plurality of hook points of the known malicious program at the kernel level, receiving and generating a plurality of behavior sequences hooked by the plurality of hook points of the known malicious program, and including: a behavior-to-state sub-module converting the plurality of behavior sequences into a set of state transition sequences; a pattern generating module establishing a statistical model with the set of the state transition sequences, wherein the statistical model constructs a transferring probability for the set of the state transition sequences to generate a plurality of malicious program family patterns; and a pattern recognizing module receiving a pattern of the to-be-tested program generated from the memory address pointed by the at least one kernel function sequence, retrieving the plurality of malicious program family patterns for comparison with the pattern to calculate a set of match scores of the to-be tested program, and including: a determining sub-module identifying a maximum match score from the set of the match scores, wherein the to-be-tested program is taken as containing at least one of the hook points of the malicious program when the maximum matching score is greater than a threshold.

7. The system of Embodiments 5-6, wherein: the behavior-to-state sub-module converts the plurality of behavior sequences into the set of the state transition sequences by grouping the plurality of behavior sequences into a plurality of behavior sequence groups, divides the plurality of behavior sequence groups via an algorithm into a plurality of state groups, each which has a plurality of states with similar arguments, and assigns to each of the plurality of state groups a unique state number; and each of the plurality of behavior sequences is a behavior state tuple including three parameters: a number of states, a state sequence, and a list of representative behaviors.

8. The system of Embodiments 5-7, wherein the pattern generating module inputs an additional set of state transition sequences of a plurality of known malicious programs from a malicious program family into the statistical model, and the statistical model is further modeled to construct the transferring probabilities for the set of state transition sequences and the additional set of state transition sequences to generate a representative pattern for the malicious program family.

9. The system of Embodiments 5-8, wherein the behavior profiling module checks whether an execution datapath in an execution that invokes the plurality of hook points fetches a plurality of tainted information so as to generate the plurality of behavior sequences.

10. The system of Embodiments 5-9, wherein the determining module further comprises an approach to neglect one of different and redundant functionalities provided by a single function when different arguments are given to the single function.

11. The system of Embodiments 5-10, wherein the behavior profiling module further comprises a random number filtering sub-module locating a pseudo random number generator in the system.

12. The system of Embodiments 5-11, wherein the random number filtering sub-module taints random data generated by the pseudo random number generator with a special tag so as to ensure that the tainted random data spread in the system can be identified.

13. The system of Embodiments 5-12, wherein the random number filtering sub-module identifies a plurality of datatype paths and filters out the respective datatype path that contains random data tainted with the special tag.

14. The system of Embodiments 5-13, wherein the system has a time always adjusted to a fixed time before the plurality of behavior sequences are generated.

15. A method for determining whether a to-be-tested program contains malicious behaviors, comprising steps of: providing an emulator having a kernel and a plurality of installed hook points, wherein the kernel has a plurality of in-kernel functions; executing the to-be-tested program in the emulator dynamically to invoke the plurality of installed hook points to obtain a specific in-kernel function set from the plurality of in-kernel functions; and determining whether the to-be-tested program contains instructions of the malicious behaviors based on an invocation sequence of the specific in-kernel function set.

16. The method of Embodiment 15, further comprising steps of: processing the specific in-kernel function set to reduce an effect of a random number upon the specific in-kernel function set; extracting useful information from the specific in-kernel function set to recognize a temporal pattern hidden in the invocation sequence of the specific in-kernel function set, wherein the useful information is platform-independent and has string patterns; profiling the useful information by normalizing the string patterns for obtaining an argument similarity of the specific in-kernel set; and grouping the profiled useful information based on the argument similarity.

17. The method of Embodiments 15-16, further comprising steps of: generating a pattern of the to-be-tested program by using the profiled useful information as an input into a statistical model; retrieving a plurality of representative patterns from a pre-established database of a plurality of known malicious program families; and obtaining a maximal degree of similarity between the to-be-tested program and one of the plurality of known malicious program families by comparing the pattern with the plurality of representative patterns.

18. The method of Embodiments 15-17, wherein: each representative pattern of the known malicious program family is in a form of a tuple including a number of states, a statistical transition matrix and a list of centroids; and the pattern of the to-be-tested program is in a form of a tuple including a number of states, a state sequence derived from the invocation sequence, and a list of representative behaviors in the state sequence, respectively corresponding to the number of states, the statistical transition matrix and the list of centroids of each representative pattern.

19. The method of Embodiments 15-18, further comprising a step of: determining whether the to-be-tested program contains instructions of the malicious behaviors when the maximal degree of similarity exceeds a threshold.

20. The method of Embodiments 15-19, further comprising steps of storing the pattern of the to-be-tested program and evaluating a deviation between the pattern of the to-be-tested program and the stored pattern.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for generating an in-kernel hook point candidate, comprising steps of:
    checking whether an in-kernel access instruction matches a specific format, wherein the in-kernel access instruction uses an index pointer and an offset value associated with the index pointer;
    recording the offset value of the in-kernel access instruction in an instruction list structure if the in-kernel access instruction matches the specific format;
    recording a memory address corresponding to the in-kernel access instruction in the instruction list structure and recording an initializing memory address of the instruction list structure as the in-kernel hook point candidate if the index pointer points to one of a stack pointer and a frame pointer;
    if the index pointer does not point to one of a stack pointer and a frame pointer, performing a backward-slicing operation on the instruction list structure if the in-kernel access instruction does not conform to either one of conditions of matching the specific format and pointing to one of the stack pointer and the frame pointer; and
    outputting the recorded initializing memory address of the instruction list structure as the in-kernel hook point candidate.

2. The method as claimed in claim 1, wherein:
    the in-kernel access instruction includes a set of in-kernel instructions recorded on an access memory region;
    the set of in-kernel instructions is generated by collecting kernel function invocation sequences invoked by executing a program with certain behavior; and
    each in-kernel instruction contains a specific string pattern.

3. The method as claimed in claim 2, wherein the to-be-tested program includes nodes of random occurrence, and the method further comprises a step of:
    executing the program with certain behavior dynamically more than once to eliminate the nodes in order to refine an execution path, wherein the execution path comprises the in-kernel access instruction for being checked in the checking step.

4. The method as claimed in claim 3, wherein the program with certain behavior is executed dynamically in a guest OS (Operating System) kernel of an emulator.

5. A system for determining whether a to-be-tested program contains a malicious program, wherein the to-be-tested program includes nodes of random occurrence, the system comprising:
    a processor, a disk and a memory cooperating with a virtual machine monitor including:
    a refining module executing the to-be-tested program multiple times to eliminate the nodes;
    a recording module recording a plurality of instructions executed by the to-be-tested program at a kernel level;
    a checking module checking whether at least one kernel function sequence invoked by the plurality of instructions points to a memory address containing a specific argument; and
    a determining module determining whether the to-be-tested program contains malicious intents by checking whether the memory address pointed by the at least one kernel function sequence contains a hook point of the malicious program according to the specific argument;
    a hook point candidate generating module generating and outputting a plurality of hook point candidates for selection based on a known malicious program, wherein the plurality of hook point candidates include a file path of the disk and a registry of the memory, and the virtual machine monitor runs inside a guest operating system to inspect the file path and the registry;
    a hook selection module receiving an input to select a plurality of hook points among the plurality of hook point candidates of the known malicious program;
    a behavior profiling module receiving and installing the plurality of hook points of the known malicious program at the kernel level, receiving and generating a plurality of behavior sequences hooked by the plurality of hook points of the known malicious program;
    a behavior-to-state sub-module converting the plurality of behavior sequences into a set of state transition sequences;
    a pattern generating module establishing a statistical model with the set of the state transition sequences, wherein the statistical model constructs a transferring probability for the set of the state transition sequences to generate a plurality of malicious program family patterns; and
    a pattern recognizing module receiving a pattern of the to-be-tested program generated from the memory address pointed by the at least one kernel function sequence, retrieving the plurality of malicious program family patterns for comparison with the pattern to calculate a set of match scores of the to-be tested program, and including:
    a determining sub-module identifying a maximum match score from the set of the match scores, wherein the to-be-tested program is taken as containing at least one of the hook points of the malicious program when the maximum matching score is greater than a threshold.

6. The system as claimed in claim 5, wherein:
    the behavior-to-state sub-module converts the plurality of behavior sequences into the set of the state transition sequences by grouping the plurality of behavior sequences into a plurality of behavior sequence groups, divides the plurality of behavior sequence groups via an algorithm into a plurality of state groups, each of which has a plurality of states with similar arguments, and assigns to each of the plurality of state groups a unique state number; and each of the plurality of behavior sequences is a behavior state tuple including three parameters: a number of states, a state sequence, and a list of representative behaviors.

7. The system as claimed in claim 5, wherein the pattern generating module inputs an additional set of state transition sequences of a plurality of known malicious programs from a malicious program family into the statistical model, and the statistical model is further modeled to construct the transferring probabilities for the set of state transition sequences and the additional set of state transition sequences to generate a representative pattern for the malicious program family.

8. The system as claimed in claim 5, wherein the behavior profiling module checks whether an execution datapath in an execution that invokes the plurality of hook points fetches a plurality of tainted information so as to generate the plurality of behavior sequences.

9. The system as claimed in claim 5, wherein the determining module further comprises an approach to neglect one of different and redundant functionalities provided by a single function when different arguments are given to the single function.

10. The system as claimed in claim 5, wherein the behavior profiling module further comprises a random number filtering sub-module locating a pseudo random number generator in the system.

11. The system as claimed in claim 10, wherein the random number filtering sub-module taints random data generated by the pseudo random number generator with a special tag so as to ensure that the tainted random data spread in the system can be identified.

12. The system as claimed in claim 11, wherein the random number filtering sub-module identifies a plurality of datatype paths and filters out the respective datatype path that contains random data tainted with the special tag.

13. The system as claimed in claim 5, wherein the system has a time always adjusted to a fixed time before the plurality of behavior sequences are generated.

14. A method for determining whether a to-be-tested program contains malicious behaviors, comprising steps of:
providing a virtual machine monitor having a kernel and a plurality of installed hook points, wherein the kernel has a plurality of in-kernel functions, and the virtual machine monitor runs in a guest operating system;
executing the to-be-tested program in the virtual machine monitor dynamically to invoke the plurality of installed hook points to obtain a specific in-kernel function set from the plurality of in-kernel functions;
selecting a plurality of hook points among the specific in-kernel function set, wherein the plurality of hook points include at least one of a file path of a disk and a registry of a memory, and the virtual machine monitor inspects the at least one file path and the registry;
receiving and installing the plurality of hook points related to the malicious behaviors at the kernel level, and receiving and generating a plurality of behavior sequences hooked by the plurality of hook points;
converting the plurality of behavior sequences into a set of state transition sequences;
establishing a statistical model with the set of the state transition sequences, wherein the statistical model constructs a transferring probability for the set of the state transition sequences to generate a plurality of malicious program family patterns;
receiving a pattern of the to-be-tested program generated from a memory address pointed by at least one of the plurality of in-kernel functions, and retrieving the plurality of malicious program family patterns for comparison with the pattern to calculate a set of match scores of the to-be tested program; and
determining whether the to-be-tested program contains instructions of the malicious behaviors based on an invocation sequence of the specific in-kernel function set by identifying a maximum match score from the set of the match scores, wherein the to-be-tested program is taken as containing at least one of the hook points of the malicious program when the maximum matching score is greater than a threshold.

15. The method as claimed in claim 14, further comprising steps of:
processing the specific in-kernel function set to reduce an effect of a random number upon the specific in-kernel function set;
extracting useful information from the specific in-kernel function set to recognize a temporal pattern hidden in the invocation sequence of the specific in-kernel function set, wherein the useful information is platform-independent and has string patterns;
profiling the useful information by normalizing the string patterns for obtaining an argument similarity of the specific in-kernel set; and
grouping the profiled useful information based on the argument similarity.

16. The method as claimed in claim 15, further comprising steps of:
generating a pattern of the to-be-tested program by using the profiled useful information as an input into a statistical model;
retrieving a plurality of representative patterns from a pre-established database of a plurality of known malicious program families; and
obtaining a maximal degree of similarity between the to-be-tested program and one of the plurality of known malicious program families by comparing the pattern with the plurality of representative patterns.

17. The method as claimed in claim 16, wherein:
each representative pattern of the known malicious program family is in a form of a tuple including a number of states, a statistical transition matrix and a list of centroids; and
the pattern of the to-be-tested program is in a form of a tuple including a number of states, a state sequence derived from the invocation sequence, and a list of representative behaviors in the state sequence, respectively corresponding to the number of states, the statistical transition matrix and the list of centroids of each representative pattern.

18. The method as claimed in claim 16, further comprising a step of:
determining whether the to-be-tested program contains instructions of the malicious behaviors when the maximal degree of similarity exceeds a threshold.

19. The method as claimed in claim 18, further comprising steps of storing the pattern of the to-be-tested program and evaluating a deviation between the pattern of the to-be-tested program and the stored pattern.

* * * * *